United States Patent [19]

McDaniel

[11] Patent Number: 4,930,342
[45] Date of Patent: Jun. 5, 1990

[54] CONTAINER LEAK DETECTOR

[75] Inventor: P. K. McDaniel, Richland, Wash.

[73] Assignee: Seal Integrity Systems, Inc., Richland, Wash.

[21] Appl. No.: 106,229

[22] Filed: Oct. 6, 1987

Related U.S. Application Data

[63] Continuation-in-part of Ser. No. 938,027, Dec. 4, 1986, Pat. No. 4,747,298.

[51] Int. Cl.[5] ............................................. G01M 3/32
[52] U.S. Cl. ...................................... 73/49.3; 73/49.8; 73/52
[58] Field of Search ................... 73/40, 37, 49.2, 49.3, 73/49.8, 52; 138/90

[56] References Cited

U.S. PATENT DOCUMENTS

| | | | |
|---|---|---|---|
| 1,825,744 | 10/1931 | Landrum | 73/52 |
| 2,093,429 | 9/1937 | Foss | 73/52 |
| 2,155,602 | 4/1939 | Keulers | 138/90 |
| 2,339,639 | 1/1944 | Henszey | 73/52 |
| 2,527,560 | 10/1950 | Maher | 73/49.2 |
| 3,520,178 | 7/1970 | Scharf | 73/49.2 |
| 3,930,401 | 1/1976 | Filler | 73/49.2 |
| 3,950,983 | 4/1976 | Slinger | 73/49.8 |
| 3,973,249 | 8/1976 | Yokote et al. | 73/49.3 |
| 3,985,018 | 10/1976 | Fox | 73/52 |
| 3,991,662 | 11/1976 | Oowada | 73/49.3 |
| 4,117,718 | 10/1978 | Hayward | 72/52 |
| 4,747,298 | 5/1988 | McDaniel | 73/49.3 |
| 4,774,830 | 10/1988 | Hulsman | 73/49.3 |

FOREIGN PATENT DOCUMENTS

| | | |
|---|---|---|
| 1209569 | of 1960 | France . |
| 0198741 | of 1983 | Japan . |
| 44637 | of 1984 | Japan . |
| 8500797 | 10/1986 | Netherlands ............................ 73/52 |

OTHER PUBLICATIONS

Article entitled "Non–Destructive Testing of Flexible Lid Seal Integrity", reprinted from *Food Processing*, approximately 1987.
Article entitled "Seal Integrity of Flexible Lids Non–Destructively Tested", *Food Processing*, July, 1987.
Product Brochure, TapTone Container Inspection Systems, a Div. of Benthos, Inc., published in May, 1987.

*Primary Examiner*—Hezron E. Williams
*Attorney, Agent, or Firm*—Wells, St. John & Roberts

[57] ABSTRACT

Disclosed are container testing apparatuses and methods for detecting leaks in containers. Such employ first and second annular seals for defining a testing chamber therebetween. An actuating seal is shown which is controllably retracted from engagement with sidewalls of the container. Another embodiment uses two passive seals. A further embodiment uses a pressurized expandable seal. In a preferred apparatus and method, at least one of the first and second seals functions by inwardly pressing against the container surfaces to enhance sealing upon application of differentially pressurized fluid within the testing fluid chamber. A detector can be employed to sense changes in the container associated with the existence of a leak through which the differential pressure of the testing fluid is communicated.

33 Claims, 8 Drawing Sheets

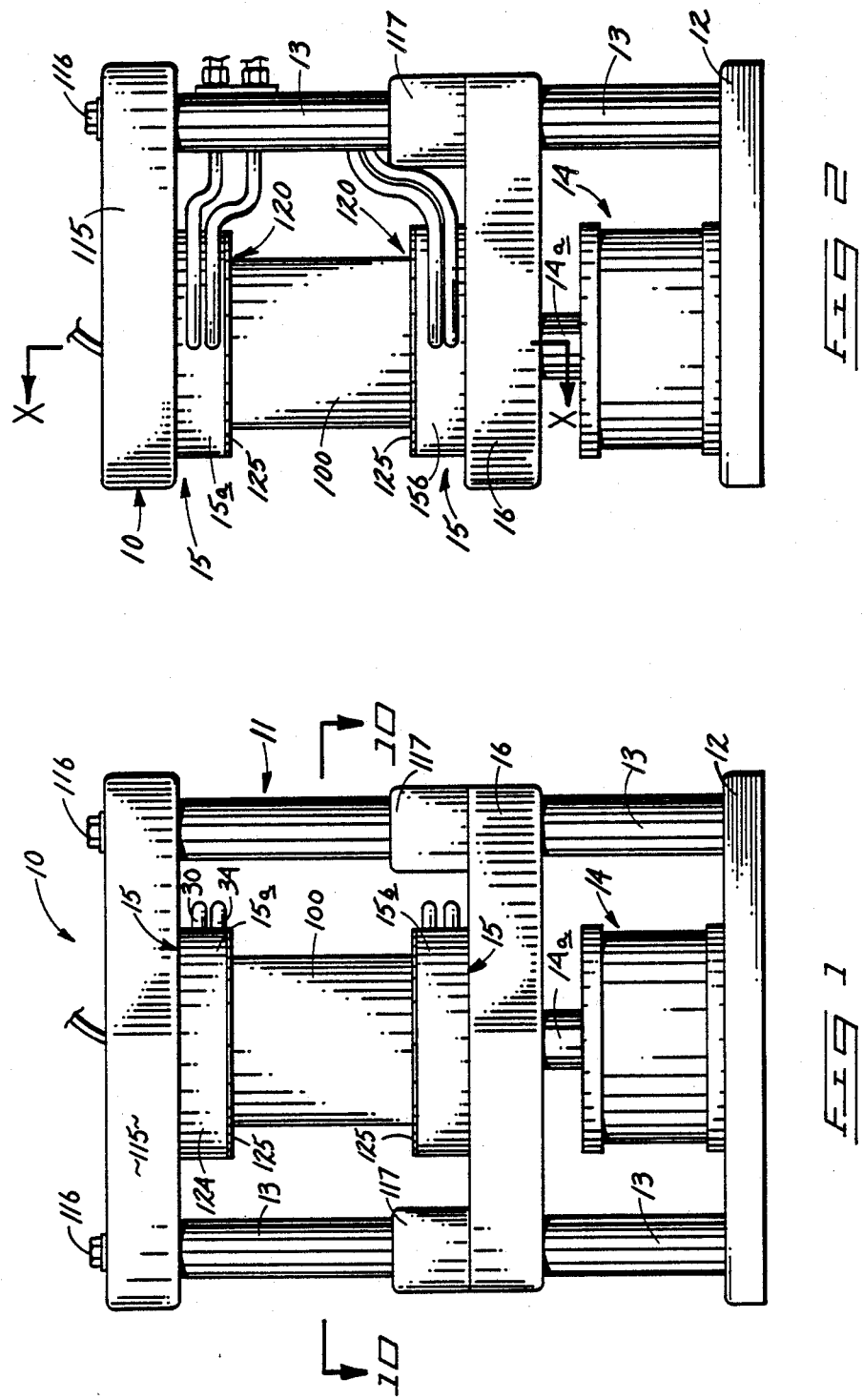

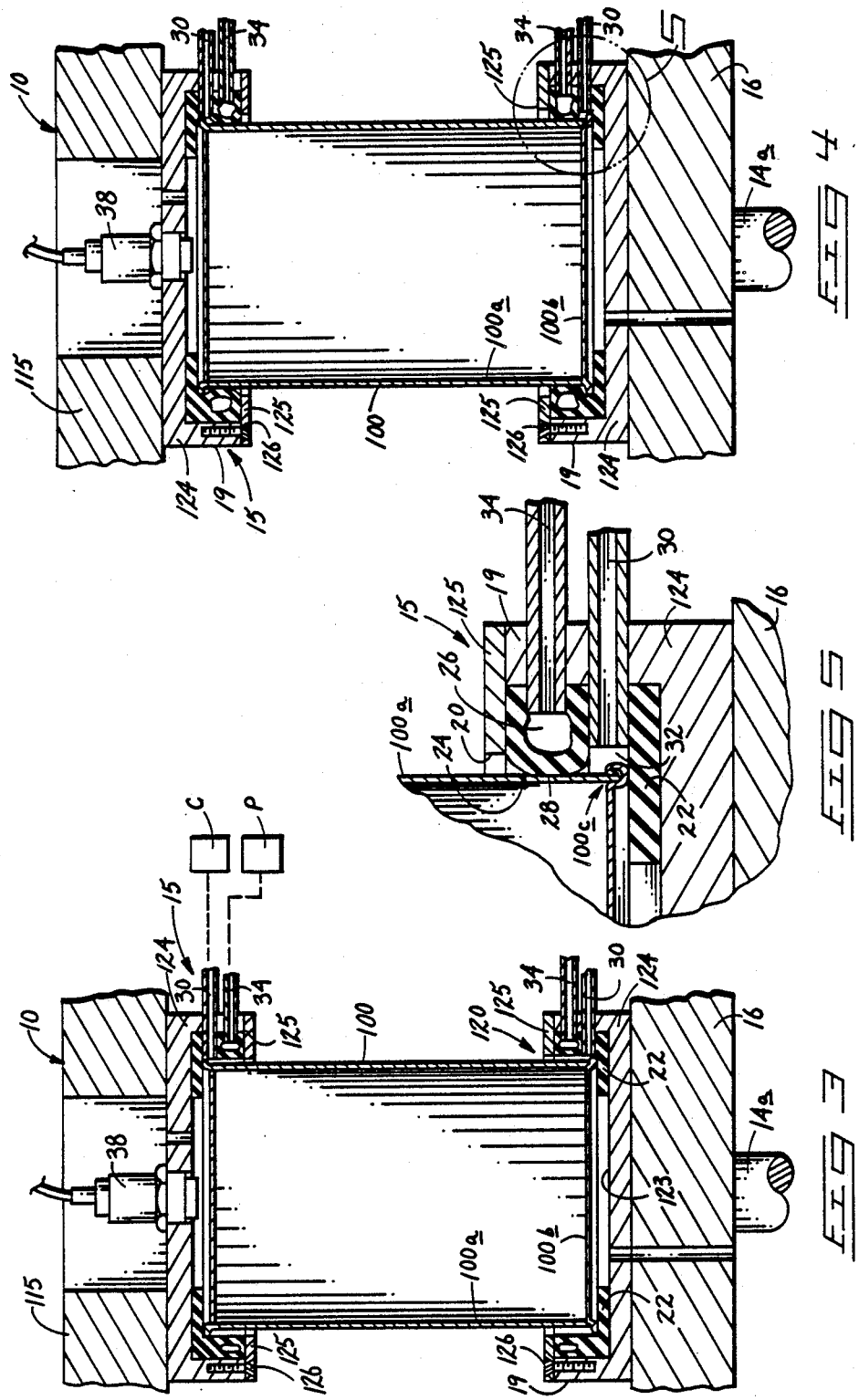

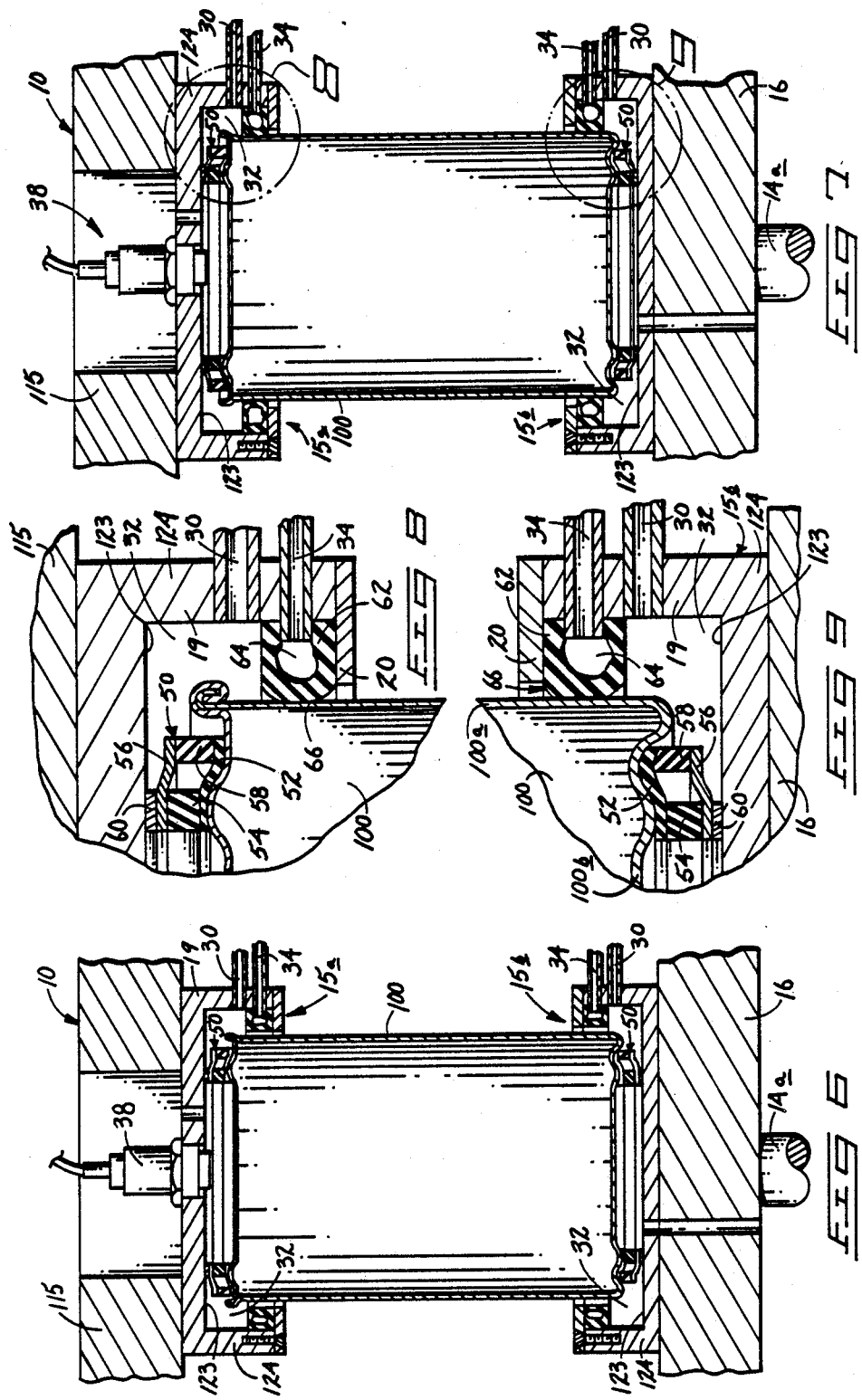

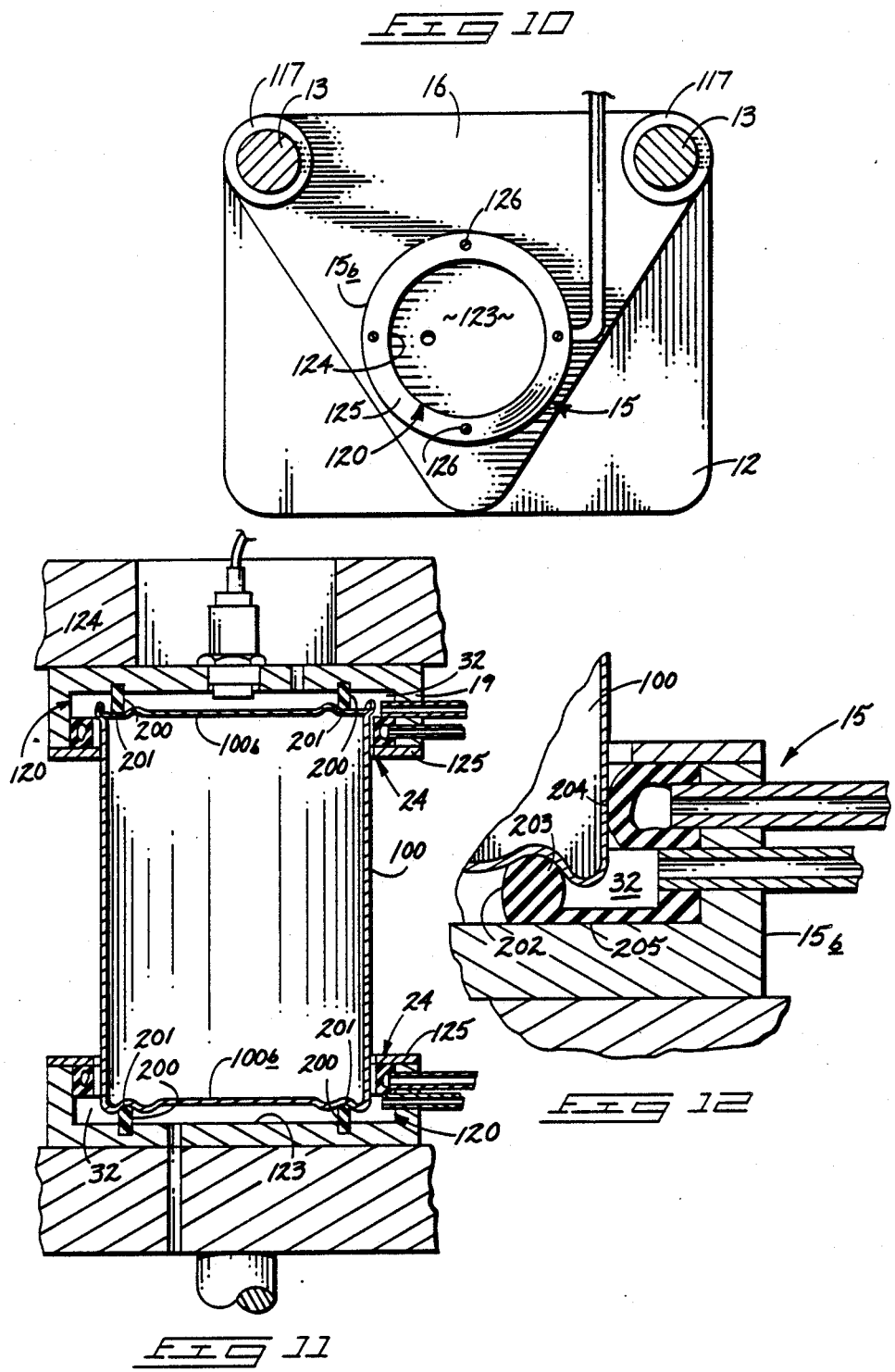

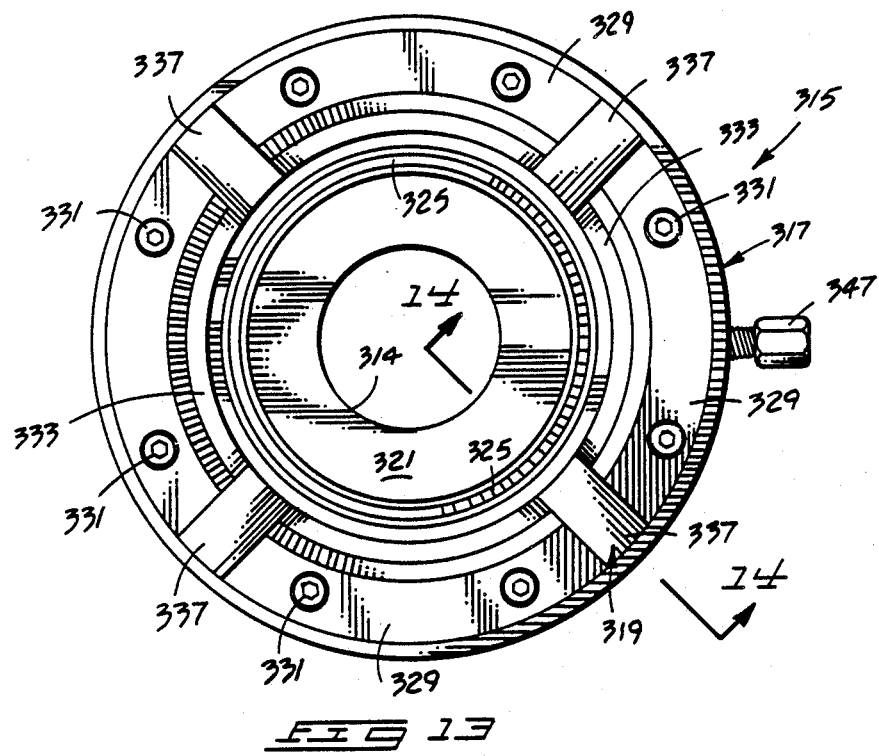
FIG 13
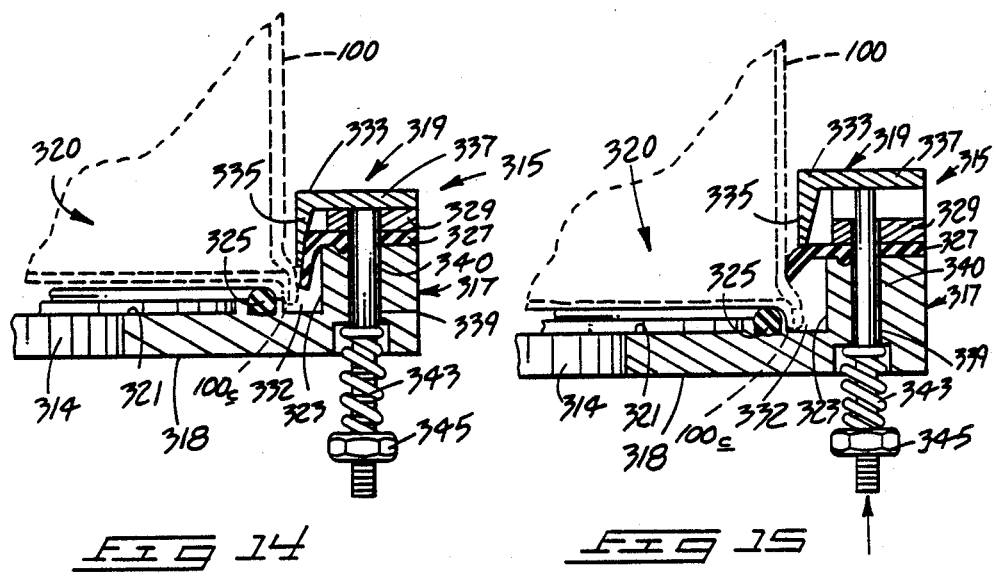
FIG 14
FIG 15

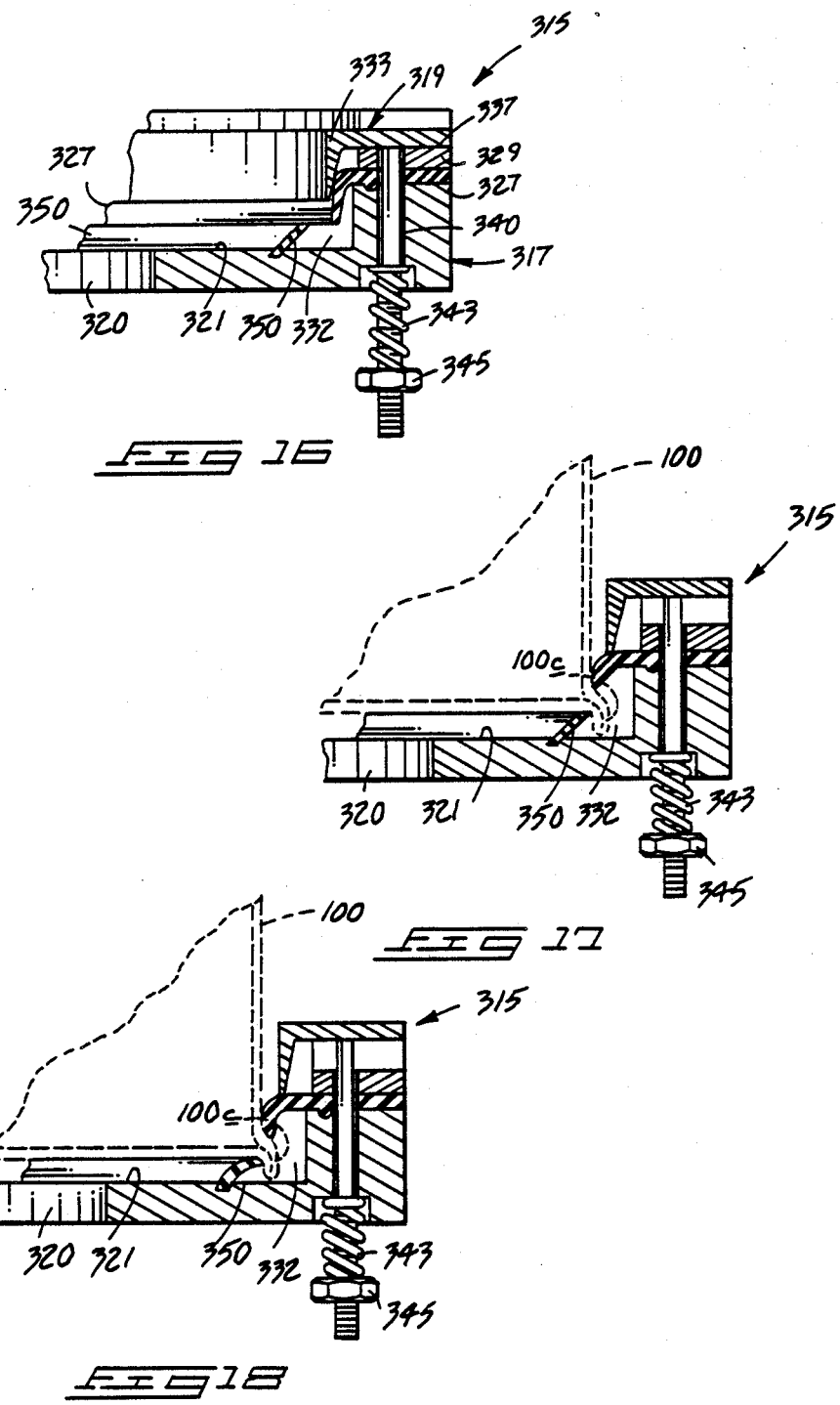

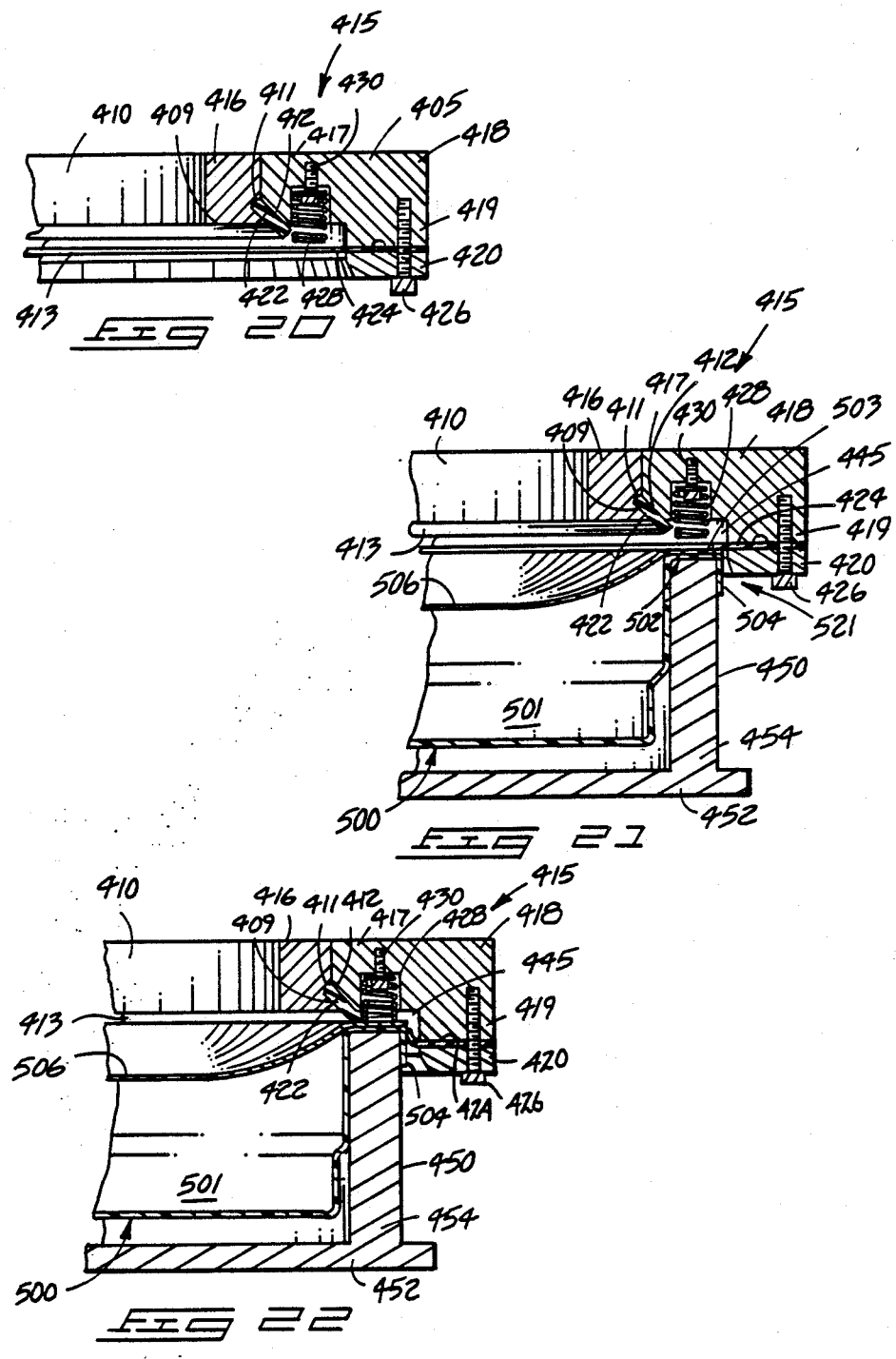

CONTAINER LEAK DETECTOR

This application is a continuation-in-part of my co-pending U.S. patent application Ser. No. 938,027, filed Dec. 4, 1986, now U.S. Pat. No. 4,747,298.

TECHNICAL FIELD

This invention relates to methods and apparatuses for detecting leaks in containers.

BACKGROUND OF THE INVENTION

In the packaging industry, particularly in food processing, it is common to package perishables in metal or other containers. The contents are typically inserted through an open end of the container which is subsequently sealed. In order to prevent contamination and subsequent spoiling of perishables packed in such containers, it is essential that the seam used to seal the container be airtight.

During packaging some of the containers develop leaks or otherwise are not sealed with an airtight seal. It is particularly important in the food packaging industry to detect such defectively sealed containers before the containers are shipped to retail outlets and subsequently purchased by a consumer. It is also important to detect unsealed containers early in the processing or packaging cycle to minimize the cost associated with further processing and handling of such containers.

Product quality control considerations often require testing of every container after it has been sealed. Because of this, it is not possible to destructively test the containers, and a reliable non-destructive testing system must be used.

Container leak testing apparatus used to test each container should be capable of fast operation in order to handle the high throughput of many high speed packaging and container sealing processes. It is further desirable to have a container testing system which can be integrated into such high speed processing lines and used to provide reliable proof testing of the containers for leaks.

There have been numerous prior art attempts to develop reliable high speed, non-destructive container seal testing equipment. One such prior art attempt is shown in U.S. Pat. No. 1,825,744 to Landrum. The Landrum patent discloses a method for detecting leaks in sealed containers by forming a seal over the peripheral edge of the closure between an end wall and a side wall of the container. The area between the seal and the end wall of the container is then evacuated. If the container leaks, the applied vacuum causes the closed end to bulge or pop outwardly producing an audible sound. The Landrum method and apparatus are only usable with containers sealed with an internal vacuum. The Landrum system requires an operator to hear or feel the pop of a defective container when a vacuum is applied. In most packaging plants the environment is extremely noisy and any such sound cannot be reliably heard by an operator. In addition, many food processing systems handle 700 cans per minute. With such a rate of processing it is impossible for a human operator to accurately detect defective containers.

Another prior art method and apparatus are disclosed in U.S. Pat. No. 2,093,429 to Foss. The Foss patent discloses a machine for testing cans which are sealed with an internal vacuum. The Foss machine evacuates the atmospheric pressure from the outside face of one end of the can. If there has been a loss of vacuum in the interior of a can, the end will flex outwardly, coming into contact with two electrical contacts which provide an electrical indication that the can has lost its internal vacuum. The Foss apparatus is usable only with cans which are sealed with an internal vacuum.

A third prior art testing apparatus is disclosed in U.S. Pat. No. 2,339,639 to Henszey. The Henszey patent discloses an apparatus for testing a specific type of can having a small opening in the center of one end of the can. The can is filled through the small opening and the opening is sealed by a drop of hot molten metal. The Henszey apparatus forms an annular seal around the small sealed opening and applies air pressure to the sealed opening. If there is a leak through the seal, the can will bulge and the apparatus will detect the bulging.

BRIEF DESCRIPTION OF THE DRAWINGS

Preferred embodiment container leak detectors according to this invention are illustrated in the accompanying drawings, in which:

FIG. 1 is a front elevational view of a container testing apparatus with a container positioned therein;

FIG. 2 is a side elevational view of the container testing apparatus of FIG. 1;

FIG. 3 is a longitudinal sectional view taken along plane X—X of FIG. 2; the perimetric seal is shown in an unpressurized or contracted position;

FIG. 4 is a longitudinal sectional view similar to FIG. 3, with the perimetric seal expanded into a sealing position;

FIG. 5 is an enlarged sectional view of the circled area indicated with the large numeral 5 shown in FIG. 4;

FIG. 6 is a longitudinal sectional view of a container testing apparatus according to this invention fitted with alternative embodiment seals; the perimetric seal is shown in an unpressurized or contracted position;

FIG. 7 is a longitudinal sectional view similar to FIG. 6, with the perimetric seal in an unpressurized or contracted position;

FIG. 8 is an enlarged sectional view of the circled area indicated with the large numeral 8 shown in FIG. 7;

FIG. 9 is an enlarged sectional view of the circled area indicated with the large numeral 9 in FIG. 7;

FIG. 10 is a cross-sectional view taken along line 10—10 of FIG. 1, with the container removed;

FIG. 11 is a longitudinal sectional view of a container testing apparatus according to this invention fitted with alternative embodiment seals;

FIG. 12 is an enlarged sectional view of a portion of a container testing apparatus according to this invention fitted with other alternative embodiment seals;

FIG. 13 is a bottom view of a sealing head portion of a further alternative embodiment container testing apparatus in accordance with the invention;

FIG. 14 is a sectional view taken along line 14—14 in FIG. 13; a container is shown in phantom engaged by the head;

FIG. 15 is a sectional view similar to FIG. 14 showing the container in a sealing position relative to the head with differential pressure being applied to the testing fluid chamber;

FIG. 16 is a sectional view of the sealing head portion of yet another embodiment of container testing apparatus in accordance with the invention;

FIG. 17 is a sectional view similar to FIG. 16 showing a container being engaged by the head;

FIG. 18 is a sectional view like FIG. 16 showing the container in sealing position relative to the head with differential pressure being applied to the testing fluid chamber;

FIG. 20 is a sectional view taken along line 20—20 in FIG. 19.

FIG. 21 is a sectional view similar to FIG. 20 showing a container and supporting base engaged by the sealing head portion; and FIG. 22 is a sectional view similar to FIG. 21 showing the container being sealingly engaged relative to the sealing head portion and base support, with differential pressure being applied to the testing fluid chamber.

DETAILED DESCRIPTION OF THE PREFERRED EMBODIMENTS

Figure 19:
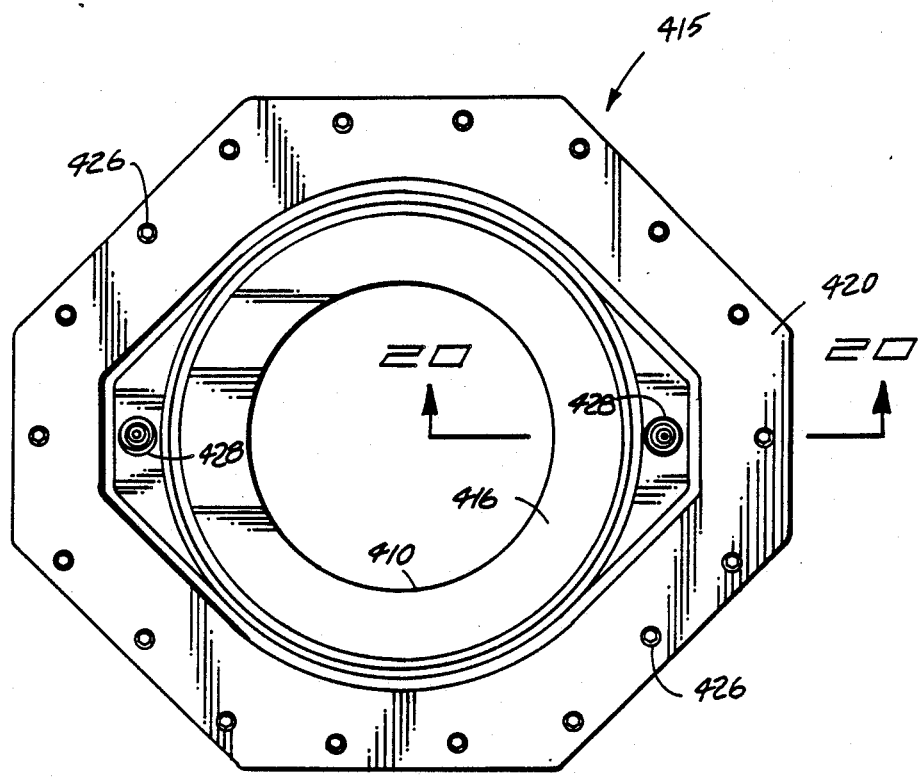
FIG. 19 is a bottom view of a sealing head portion of yet another alternative embodiment container testing apparatus in accordance with the invention.

The following disclosure of the invention is submitted in compliance with the constitutional purpose of the Patent Laws "to promote the progress of science and useful arts" (Article 1, Section 8).

The instant invention arose out of the need for a high speed, reliable, non-destructive testing method and apparatus for testing the seams of containers. One desirable feature of the present testing apparatus is that they can be easily integrated into a packaging assembly line, such as a food processing line in a cannery operation. It is also significant that testing apparatuses shown herein are capable of simultaneously testing seals formed at both ends of a typical cylindrical container, near the rims typically formed at the connection between the ends and sidewalls of the container.

A preferred container testing apparatus 10 is shown in FIGS. 1 and 2. Container testing apparatus 10 includes a support framework 11. Framework 11 includes a base plate 12 which is adapted for resting upon a supporting surface (not shown). Base plate 12 can alternatively be adapted for mounting to related machinery or other supporting structures such as by providing apertures therethrough for receiving bolts (not shown).

Framework 11 also includes a pair of upstanding stationary guide rods 13 which are rigidly connected to base plate 12 such as by welding or with fasteners (not shown). Guide rods 13 extend upwardly to a frame head piece 115 which is detachably connected thereto using bolts 116.

Guide rods 13, base plate 12 and head piece 115 form a stationary framework for mounting one or more container engaging testing heads 15. An upper testing head 15a is rigidly mounted to head piece 115. A lower testing head 15b is movably mounted using a guide plate 16. Guide plate 16 is slidably mounted for linear motion upon guide rods 13 using slide bearings 117, well known in the art. Slide bearings 117 are rigidly connected to guide plate 16 in order to maintain accurate linear travel of the guide plate and connected testing head 15b.

Testing apparatus 10 further includes a hydraulic or pneumatic ram 14 which is mounted to base plate 12. A piston rod 14a extends upwardly from remaining portions of ram 14, preferably in an orientation which is parallel to guide rods 13. Piston rod 14a is extendible to raise or extend guide plate 16 and testing head 15b. Piston rod 14a is also contractible to lower or retract the guide plate and testing head. Other alternative means for movably mounting one or more testing heads will be apparent to those of skill in the art.

Reference to FIGS. 2 and 10 indicates that testing heads 15a and 15b are advantageously mounted in an overhung or cantilever arrangement with respect to guide rods 13. This cantilever arrangement allows container 100 to be easily inserted laterally between the testing heads from either side and from the front. Framework head piece 115 and guide plate 16 are advantageously shown in a triangular planar configuration, although other configurations are clearly possible.

Testing heads 15a and 15b are constructed similarly, each having a primary or testing head member 124. Testing heads 15a and 15b are mounted upon headpiece 115 and guide plate 16, respectively, in an opposed, facing arrangement to allow simultaneous reception of opposing ends of container 100. Testing heads 15 are preferably detachable using suitable fasteners (not shown).

Testing heads 15 are shown constructed to receive and test a cylindrical container and are accordingly circular in plan view (see FIG. 10). Other container shapes can also be tested with appropriately shaped testing heads adapted to receive and seal against such containers in manners which will hereinafter be described.

Testing heads 15 each have an end receiving receptacle 120 adapted to receive the ends of container 100. Testing head members 124 include bottom walls 123 (FIG. 3) which define the bottoms of receptacles 120. Annular side sections 19 extend longitudinally from bottom walls 123 along a portion of the container sidewalls 100a.

Detachable retaining rings 125 are mounted upon annular side sections 19 using suitable fasteners 126. Retaining rings 125 serve to retain an expandable perimetric seal 24 in longitudinal position within testing heads 15 (see FIG. 5). The inside edges or lips 20 of retaining rings 125 are normally spaced from sidewalls 100a of container 100 to provide clearance for insertion of the container into receptacle 120.

Testing heads 15 include a first or end seal member 22 interposed between the bottom walls 123 and end surfaces 100b of container 100. First seal member 22 is advantageously a continuous annularly shaped resilient element effective at forming a fluid-tight seal between the container and the bottom wall 123 of testing head member 124. FIGS. 3–5 show that seal 22 is adapted to seal against a rim 100c formed at the end of container 100. First seal member 22 is used to create a first seal against container 100 which partially encloses a testing fluid chamber 32 and prevents pressurized testing fluid from bearing upon central portions of the container end walls 100b.

Testing heads 15 also include second or perimetric seal members 24 which are used to form a continuous second or perimetric seal against sidewalls 100a or other surfaces of container 100. Perimetric seal 24 and end seal 22 seal against container 100 to form enclosed testing fluid chamber 32. Testing fluid chamber 32 can also be enclosed by portions of bottom walls 123 and side sections 19.

Perimetric seal member 24 is an expandable seal having an internal expansion chamber 26. Internal expansion chamber 26 is advantageously a conduit which preferably extends within sealing member 24 about the entire length or perimeter defined by the seal. This full length extension of expansion chamber 26 within seal 24 provides effective sealing at a sealing face 28 about the full perimeter of container sidewalls 100a, so that a differential pressure can be maintained in testing fluid chamber 32. The planar configuration of seal 24 is circular and continuous to seal against the circular shape of container 100. The specific cross-sectional shape of seal 24 can vary to accommodate varying container shapes, sealing requirements and seal designs, as is well-known in the art.

Testing heads 15 are adapted to transmit a pressurization fluid to internal expansion chamber 26. FIG. 5 shows a tube or conduit 34 which extends through side section 19 of the testing head to communicate the pressurization fluid therethrough and into chamber 26. Other appropriate conduits or passageways (not shown) are also clearly possible.

Pressurization fluid is controllably supplied and released through tube 34 to expand and contract seal 24, as illustrated in FIGS. 3 and 5, respectively. Control of pressurization fluid can occur using well-known solenoid or other appropriately operated valves (not shown) as is well-known in the art. Any suitable means for pressurizing the pressurization fluid is possible such as by compressor or pump shown graphically in FIG. 3 at P. Air can advantageously be used as a pressurization fluid.

FIGS. 3-5 show that first and second seals 22 and 24 can advantageously be made in the form of an integrated L-shaped piece made from an elastomeric or other resilient material. Alternatively, the first and second seals can be made from separate pieces such as shown in FIGS. 6-9 and 11. The first and second seals can also be made integral in the form shown by FIG. 12.

Testing heads 15 are also provided with means graphically shown at C in FIG. 3 for transmitting a testing fluid to and from the testing fluid chamber 32. FIG. 3 shows a small tube or conduit 30 which extends through a port formed through side section 19 of testing head member 124. The application of appropriately pressurized testing fluid through tube 30 from means C is advantageously controlled using an appropriate conventional control valve (not shown). Other alternative means for applying and releasing a differentially pressurized testing fluid to chamber 32 will be obvious to those of skill in the art. Testing fluid can be supplied from a tank or from a compressor, vacuum pump, or other fluid supplies, well-known in the art.

FIG. 11 shows testing apparatus 10 fitted with an alternative form of end seal 200 within the upper and lower test heads 15a and 15b. The end seals 200 are formed of annular rings of resilient material mounted to the bottom test head walls 123. Surfaces 201 of the seals 200 resiliently engage the container along the top and bottom end surfaces of the containers inwardly adjacent the container rims.

FIG. 12 shows another form of end seal 202 in which an annular ring 203 is integral with a perimetric seal 204. The annular ring 203 may be substantially identical to the end seal 200 described above. The perimetric seal 204 may be substantially identical to the seal 24 also described. The seals 202 and 204 are shown connected integrally by a web 205 of material common to both seals. The annular seal chamber 32 is thus defined primarily by the seals 202, 204, the web 205, and the container surfaces situated between the two seals.

FIGS. 6-9 show testing apparatus 10 fitted with other alternative forms of perimetric and end seals within upper and lower testing heads 15a and 15b. Perimetric seal 62 includes an internal expansion chamber 64 and is constructed substantially as described above with respect to perimetric seal 24. Perimetric or second seal 62 has a contacting face 66 which is along the inside of the ring-shaped seal. Contacting face 66 engages and seals against sidewalls of container 100.

FIGS. 6-9 further show an alternative type of end seal or first seal 50 according to this invention. Refer to FIGS. 8 and 9 which show end seals 50 enlarged. Each end seal advantageously includes an annular connection ring 60 which is appropriately connected to the associated testing head member 124 at the bottom wall 123 thereof. Seal 50 further includes annular spring members 56 which are connected to the testing head members using connection rings 60. Seal 50 further includes first and second support rings 54 and 58 which are connected to spring 56 and also to a sealing member 52. Sealing member 52 serves to contact end surfaces of container 100 and seal thereagainst. Sealing member 52 and support rings 54 and 58 are preferably made from a flexible or resilient material such as an elastomer.

End seals 50 provide greater sealing capability where containers are provided with raised reinforcement ridges along an area inwardly adjacent to the container rims. Improved sealing occurs because of the seal's ability to conform to the ridges and provide effectively two concentric seals, one at ring 54 and the other at ring 58. This duplex sealing arrangement is enhanced by additional fluid pressure applied to spring member 56 when testing fluid chamber 32 is pressurized above ambient conditions. The fluid pressure experienced under spring member 56 (as shown in FIG. 8) is less than the testing fluid pressure in chamber 32 because of the pressure sealing occurring adjacent to ring 58. The structural arrangement of seals 50 thus provide testing fluid pressure reinforcement of the mechanical sealing force provided by ram 14, when elevated testing fluid pressures are used.

It is noteworthy that end seals 200, 202 and 50 are shown sealing against end surfaces of container 100 which are radially inward of the container rim (see FIG. 8). This should be compared to end seals 22 which seal against the rims of container 100. The specific type of container being inspected may require one type of end seal over the other. Other, alternative forms of end seals may also be apparent to those of skill in the art.

Testing head 15a is also advantageously adapted to mount a sensor or detector 38 for selectively sensing a change in the container which only occurs if there is a leak in the container surfaces adjacent to the testing fluid chambers 32. Testing apparatus 10 uses only a single detector 38 since a leak at either end of container 100 will cause a similar bulging of container 100 at both end walls 100b.

Detector 38 can alternatively be an electronic or optical position or motion detectors which are capable of selectively sensing a deformation or bulging of the container end wall. Other changes in the container may also have a detectable effect associated with the communication of the testing fluid pressure through a leak in the container. Other alternative types of detectors can accordingly be used to identify defective or leaking containers based upon such detectable effects.

The operation of testing apparatus 10 will now be explained with reference to the embodiment of FIGS. 1-5. A similar procedure will apply with regard to the alternative seal structures shown in FIGS. 6-9, 11 and 12.

Ram 14 is first retracted in order to separate the opposing testing heads 15 to provide sufficient distance therebetween to receive container 100. The container is loaded by placing the container between testing heads 15 with the container ends coaxially aligned with receptacles 120 of testing heads 15. Container 100 can be loaded either manually or by mechanized equipment.

Ram 14 is then actuated to extend rod 14a and clamp container 100 between upper and lower testing heads 15a and 15b. The clamping force provided by ram 14 also provides a sealing force which seals end seals 22 against the rims or other end surfaces of container 100.

Pressurization fluid is then supplied through conduit 34 to expand the perimetric seal 24 into sealing engagement with sidewalls of container 100. Sealing must be provided by perimetric seal 24 and end seal 22 so that a sealed testing fluid chamber 32 is formed adjacent the portions of container 100 which are to be tested for leakage.

Testing fluid chambers 32 are then supplied with a differentially pressurized testing fluid such as through tube 30. In most instances the testing fluid will be introduced at an elevated pressure in excess of atmospheric or other ambient pressure. However, in some instances it may be desirable to use reduced or negative gauge pressures and such is clearly contemplated in this invention. The testing fluids are advantageously air or nitrogen which are relatively cheap and easily available. In some circumstances it may also be desirable to use other types of testing fluids. For example, helium is a relatively small molecule and can more easily penetrate small leaks and fissures. Other specific types of liquid or gaseous fluids may have other advantages which suggest their use for particular types of containers or in specific testing circumstances.

The application of the differentially pressurized testing fluid to the container must produce a detectable effect which can be directly related to whether there is a leak in container 100 or not. When elevated testing fluid pressures are used, the testing fluid will pressurize the interior of container 100 when a leak exists. Increased pressure within the container is typically manifested by deflection of one or both end walls 100b of the container. Detector 38 senses the deflection and responds by producing an output signal. The signal from detector 38 can be analyzed and connected to a threshold sensing device which triggers an alarm or instructs automated processing equipment to divert the container into a reject conveyor system (not shown). Other types of acoustical, electrical or optical sensors can alternatively perform the same function based on a different mode of action for sensing a manifestation associated with a leak in the container being tested.

Container 100 is removed from testing apparatus 10 after the detection phase of testing, just described, has been completed. Ram 14 is contracted and the container is released for unloading and subsequent processing dependent upon whether the leak test has been passed or failed.

Novel methods according to this invention preferably involve positioning a container adjacent to the first and second sealing means so that the portion of the container to be tested is between the seals. The first or end seal is then engaged against the container to form a sufficiently effective fluid-tight seal. Sealing of the first seal is advantageously accomplished by forcing the end seal against end walls 100b of the container or vice versa.

Preferred methods further involve forming a second seal, preferably by expanding a perimetric seal inwardly to engage and seal against sidewall surfaces of the container. Expansion of the perimetric seal is advantageously accomplished by applying a pressurized sealing fluid to an internal expansion chamber within the perimetric seal. The perimetric seal expands outwardly and seals against the container.

The first and second seals must seal and enclose a testing fluid chamber so that the chamber is capable of sustaining an appropriate testing pressure for a desired testing period. The testing pressure and the testing period will depend upon the size and type of leaks being tested for and the testing fluid used. Also relevant to the pressure and time parameters are the tightness of the seals and mechanical properties of the testing equipment and the container being tested.

The method further involves selectively detecting a manifestation or effect directly associated with the existence of a leak. Detection can advantageously be based upon a bulging or mechanical deformation of the container associated with application of a differentially pressurized testing fluid.

Methods of this invention can further advantageously involve depressurizing the testing fluid chamber. The internal expansion chamber of the perimetric seal is also depressurized and retracted. The testing heads are then retracted or otherwise removed from the container and the container is unloaded from the testing apparatus. After unloading, the container is rejected due to a leak or continues onwardly for further appropriate processing.

FIGS. 13-15 show a sealing head 315 of an alternate embodiment container testing apparatus in accordance with the invention. Such a head is adapted for sealing a container 100 about annular portions to aid in detecting leaks therein. Testing head 315 can be employed with a support framework similar to framework 11 and its associated actuator mechanisms.

Testing head 315 is primarily comprised of two cooperating head subassemblies 317 and 319. Head subassembly 317 creates a container receiving receptacle 320 sized for receiving and surrounding an end of container 100 therein. Head subassembly 317 includes a headpiece 318 having a bottom wall 321 which defines the bottom of receptacle 320. An opening 314 is centrally located through the center of bottom wall 321 to relieve pressure from unsealed end areas. Annular side sections or walls 323 extend longitudinally from the perimeter of bottom wall 321 to define receptacle 320. A port 347 extends through side walls 323 to receptacle 320 to communicate testing fluid to and from the testing fluid chamber formed by receptacle 320 and a container being tested therein.

First sealing means are included within receptacle 320 for engaging and sealing against surfaces of container 100 along a first annular seal at one of the ends thereof. The first sealing means is shown as being in the form of an annular ring 325 which is adapted to engage container 100 adjacent the container end periphery. This leaves a substantial portion of the end surface of the container being tested open to atmospheric pressure through opening 314. Ring 325 is preferably constructed of a resilient or elastomeric material.

A second sealing means is also included within receptacle 320 for sealing against surfaces of container 100 along a second annular seal. The second sealing means is illustrated as being in the form of an annular sealing member 327 which extends radially inward from side walls 323 for sealingly engaging the side walls of container 100 adjacent one of its ends. Second annular sealing member 327 is a relatively flat ring-like seal preferably made of an elastomeric material, which extends to the outer periphery of head subassembly 317. Second seal 327 extends inwardly into receptacle 320 in a cantilevered arrangement to engage the sidewall surfaces of the container against which it seals. Engagement advantageously occurs in a non-perpendicular or angled manner. The contacting seal is preferably angled toward the side of higher pressure in order to restrain the seal and increase sealing force. A rigid backup ring 329 overlies annular seal 327 at the top of side walls 323 to retain seal 327 relative thereto. Backup ring 329 advantageously has an inside diameter at wall 323 of the receptacle. Ring 329 is held in position by a plurality of longitudinally oriented bolts 331 which are threaded into head subassembly 317.

A head actuation subassembly 319 overlies the primary head subassembly 317 and is movable with respect thereto. It includes a deflection or compression ring 333 or similar means for displacing or deflecting the annular sealing member 327 away from the container surfaces in order to disengage the second seal from the container (see FIG. 14). The second seal is disengaged by bending the cantilevered portions of seal member 327 using ring 333. Deflection ring 333 is adapted to bend the seal using an axially or longitudinally extending portion 335 which stands axially toward the container receptacle in the embodiment shown. The end of axial extension 335 is advantageously tapered and sized to bear against the cantilevered portion of second annular sealing member 327 to displace it both axially and outwardly away from the container surfaces. The deflection ring is advantageously continuous about outer portions of receptacle 320.

Deflection ring 333 is connected to a plurality of outwardly extending radial connection bars 337 which mount ring 333 to remaining portions of the actuation subassembly. A plurality of actuation pins 340 are connected to the radial connection bars and adapted to movably mount the actuation subassembly to primary subassembly 317. The movable mount is advantageously accomplished by extending the actuation pins longitudinally and slidably through bores 339 formed in primary head subassembly 317. Each pin 340 is preferably provided with a helical spring 343 at its lower end. A nut 345 is advantageously threaded to the end of each pin 340 to retain spring 343 between a recess formed in head member 318 and nut 345. Springs 343 function to normally bias the compression ring against sealing member 327 to disengage the second seal from the container surfaces.

Operation of testing head 315 is best understood with reference to FIGS. 14 and 15. FIG. 14 illustrates a container 100 being initially placed within receptacle 320 of testing head 315. Container 100 slides longitudinally into receptacle 320 as axial extension 335 of compression ring 333 retracts the second annular sealing member 327 so it is radially away from the container. FIG. 15 illustrates nut 345 on pin 340 being depressed upwardly against the biasing action of spring 343 to displace compression ring 333 longitudinally away from sealing member 327, thus allowing the second seal to contract against the container sidewalls. In this position, the first sealing member 325 is also bearing tightly against an end surface of container 100. The first and second sealing members thus enclose a testing fluid chamber 332 which extends about an annular portion of container 100 which includes container rim 100c.

Application of a pressurized testing fluid through port 347 provides two functions. First, the pressurized fluid causes second sealing member 327 to further contract and press against the side surfaces of container 100 to reinforce the desired second seal. Second, application of pressurized fluid also provides a pressurized medium within the testing fluid chamber for causing a detectable effect on the container, such as caused by pressurized testing fluid passing through a leak present in the annular portion of the container exposed to the testing fluid chamber. The effect of such a leak on the container can be detected as previously described. For example, a detector could be mounted above opening 314 to detect deflection of the end of the container caused by increased or decreased pressure within the container.

Upon completion of the test, pressure within testing fluid chamber 332 is released. The actuation pins are then released thus causing the second seal to be disengaged from the container by compression ring 333. The container can then be withdrawn from the testing head either manually or using suitable equipment.

FIGS. 16, 17 and 18 illustrate testing head 315 employing an alternate first annular sealing member 350. Annular seal 350 is comprised of a flexible, resilient material which angles outwardly and upwardly toward the rim of the container so as to engage to the end of container 100 in a non-perpendicular manner. FIG. 17 illustrates container 100 and head 315 engaged at the point where the biasing force of spring 343 has been overcome to enable second annular sealing member 327 to bear against the container side surfaces. Upon application of a pressurized fluid to testing chamber 332 (FIG. 18), both the first and second sealing members deform toward the container surfaces against which they bear to provide increased sealing force. The container engaging or distal end of seal 350 is angled toward the testing fluid chamber so that increased pressure reinforces the sealing effect against the container. Thus in this embodiment, both the first and second sealing members produce additional sealing effect upon the application of pressurized fluid to the testing fluid chamber.

FIGS. 19-22 illustrate yet another testing head assembly 415 adapted for leak testing an irregularly shaped container 500. FIG. 21 shows container 500 in the form of a molded or extruded dish or bowl having an inner receptacle 501 and opposed extensions 521 to assist in grasping of the bowl when hot. The outer portions of container 500 includes an annular rim 502 having a flattened portion 503 and an axial reinforcement extension 504 which extends about the outer periphery of the dish. Such a container typically has a cover 506 of foil, plastic or other thin material adhered to rim 502 by a flattened bead of adhesive interposed between the cover and the flattened portion 503 of rim 502. The containers are typically vacuum sealed causing the foil to contract downward against the container contents.

Testing head 415 is comprised of three major components 416, 418 and 420. Components 416, 418 and 420 cooperatively retain a pair of first and second annular sealing members 422 and 424, and also define a container testing receptacle 413. The central portion of testing head 415 includes an opening 410. Primary head component 418 is the largest of components 416, 418, and 420 and forms the greatest portion of testing head 415. It is substantially L-shaped including an inwardly projecting radial portion 417 and a shorter axially extending portion 419. A port (not shown) is provided through axial portion 419 for communicating differentially pressurized testing fluid to receptacle 413. The radial portion 417 includes an inwardly beveled surface 412 against which first seal 422 is clamped using inner component ring 416.

Component 416 is an annular ring received radially inward and against the radial portion 417 of primary head 418. The radially outermost surface of ring 416 includes an indentation 411 and an associated outward projection 409 which extends in parallel fashion relative to beveled surface 412. First seal 422 is continuous, circuitous, and annular and is retained between surface 412 and projection 409. As shown in FIGS. 20–22, seal 422 angles downwardly and radially outward relative to head 415.

Head component 420 functions as a second seal retaining ring and is preferably in the form of a flattened annular ring member which bears against the bottom surface of the axial extention 419 of primary head piece 418. A plurality of bolts 426 secure the second seal retaining ring 420 to head 418. A continuous, circuitous and annular second sealing member 424 is sandwiched between ring 420 and primary head piece 418, and is adapted to extend radially inward toward receptacle 413 in a perpendicular cantilevered arrangement.

A pair of diametrically opposed springs 428 are advantageously included and extend downwardly from the radial projection portion 417 of primary head 418 and into container receptacle 413. A pair of bolts 430 are received by head component 418 for securing springs 428 thereto. Springs 428 function to disengage the container from the testing head after the container has been tested, as will be more fully described below.

Operation of testing head 415 will best be understood with reference to FIGS. 21 and 22. A base or container support 450 is employed for supporting container 500 for engagement by head 415. Container support 450 includes a bottom 452 and a wall 454 which extends perpendicularly upwardly therefrom. Wall 454 extends about bottom 452 and can advantageously conform to the peripheral shape of container 500. The upper portions of wall 454 engage container 500 beneath the flattened rim portion 503 to provide desired support for engagement of head 415 against container 500.

FIG. 21 illustrates head 415 positioned adjacent to container 500 supported by base 450. As head 415 first contacts container 500, second sealing member 424 engages the flattened rim portion 503 at near the outermost periphery of the container rim. Further engagement of head 415 relative to container 500 causes first sealing member 424 to bend upwardly and compress against the axial extension portion 504 of the container rim. Further movement of head 415 relative to base 450 and container 500 causes seal 422 to engage the flattened rim portion 503 along the inner edge thereof thus causing the seal to compress and flatten against the rim to form a seal (see FIG. 22). In this fully engaged position, both seals 422 and 424 angle at the container surfaces in a manner toward the pressurized testing fluid chamber. Seals 422 and 424 define testing fluid chamber 445 together with the primary head piece 418. Application of elevated pressure within chamber 445 causes a differential pressure across seals 422 and 424 which further reinforces the sealing caused by mechanically compressing the first and second seals against the container surfaces. The springs 428 also engage against flattened rim portion 503 of container 500, as shown in FIG. 22, when head 415 has been fully engaged relative to container 500.

A suitable detector such as a conventional proximity gauge, is incorporated with head 415 to detect movement of flexible container top 506 caused by a leak in the container, such as at the adhesive joint between container top 506 and rim 503. The top of container 500 which is not exposed to testing chamber 445 is preferably open to atmospheric pressure, such as through opening 410.

After completion of the test, pressure is relieved from testing chamber 445 and head 415 is disengaged relative to container 500 and container support 450. Springs 428 assist in breaking the seals created by sealing members 422 and 424 by biasing against container 500 to force the container and head from one another.

The embodiments described above can be constructed using well-known metal and plastic working and machining techniques directed to producing the structures described above or equivalents thereof.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A container testing apparatus for nondestructively testing a sealed container by applying a differential pressure to the container about limited annular portions of exterior surfaces of the container to aid in detecting leaks therein, comprising:

a frame;

at least one testing head mounted to said frame and having a container receptacle sized for receiving and surrounding an end of the container therein;

first sealing means within the receptacle for engaging and sealing against exterior surfaces of the container along a first annular seal at an end of the container;

second sealing means within the receptacle for sealing against exterior surfaces of the container along a second annular seal spaced from the first annular seal;

seal actuation means for controllably moving at least one of said first or second sealing means between extended and retracted positions; the seal actuation means including an annular deflection ring for controllably deflecting a flexible sealing member forming at least part of at least one of said sealing means; and wherein the deflection ring is movable relative to the sealing member and includes at least one axial extension which engages the sealing member upon movement of the sealing member and deflection ring relative to one another to thereby move the sealing member away from container surfaces;

said first and second sealing means defining at least portions of an annular testing fluid chamber adapted to apply a differentially pressurized testing fluid about an annular testing zone portion of the exterior surfaces of the container when said first and second sealing means are in sealing engagement against the container; and means for providing a desired differential pressure within the testing fluid chamber and against the annular portion of the container which is being tested.

2. A container testing apparatus according to claim 1 and further comprising biasing means for biasing the deflection ring.

3. A container testing apparatus according to claim 2 wherein the biasing means acts to bias the deflection ring into a position wherein the deflection ring engages the flexible sealing member and displaces the sealing member away from surfaces of the container.

4. A container testing apparatus for nondestructively testing a sealed container by applying a differential pressure to the container about limited annular portions of exterior surfaces of the container to aid in detecting leaks therein, comprising:

a frame;

at least one testing head mounted to said frame and having a container receptacle sized for receiving and surrounding an end of the container therein;

first sealing means within the receptacle for engaging and sealing against exterior surfaces of the container along a first annular seal at an end of the container;

second sealing means within the receptacle for sealing against exterior surfaces of the container along a second annular seal spaced from the first annular seal;

seal actuation means for controllably moving at least one of said first or second sealing means between extended and retracted positions; the seal actuation means including a compression ring for displacing a sealing member away from the container surfaces when the apparatus and container are sealingly disengaged;

said first and second sealing means defining at least portions of an annular testing fluid chamber adapted to apply a differentially pressurized testing fluid about an annular testing zone portion of the exterior surfaces of the container when said first and second sealing means are in sealing engagement against the container; and means for providing a desired differential pressure within the testing fluid chamber and against the annular portion of the container which is being tested.

5. A container testing apparatus for nondestructively testing a sealed container by applying a differential pressure to the container about limited annular portions of exterior surfaces of the container to aid in detecting leaks therein, comprising:

a frame;

at least one testing head mounted to said frame and having a container receptacle sized for receiving and surrounding an end of the container therein;

first sealing means within the receptacle for engaging and sealing against exterior surfaces of the container along a first annular seal at an end of the container;

second sealing means within the receptacle for sealing against exterior surfaces of the container along a second annular seal spaced from the first annular seal;

seal actuation means slidably connected to the testing head for controllably moving at least one of said first or second sealing means between extended and retracted positions; the seal actuation means being mounted for slidable motion along an axial direction to engage a sealing member which is cantilevered to extend toward a container surface;

said first and second sealing means defining at least portions of an annular testing fluid chamber adapted to apply a differentially pressurized testing fluid about an annular testing zone portion of the exterior surfaces of the container when said first and second sealing means are in sealing engagement against the container; and means for providing a desired differential pressure within the testing fluid chamber and against the annular portion of the container which is being tested.

6. A container testing apparatus according to claim 5 wherein the sealing member is on at least said second sealing means; said sealing member extending inwardly toward the container in a cantilevered arrangement adapted for deflection by at least one axial extension forming a part of said seal actuation means.

7. A container testing apparatus according to claim 6 wherein said first sealing means is substantially unactuated and adapted to engage end surfaces of the container.

8. A container testing apparatus for nondestructively testing a sealed container by applying a differential pressure to the container about limited annular portions of exterior surfaces of the container to aid in detecting leaks therein, comprising:

a frame;

at least one testing head mounted to said frame and having a container receptacle sized for receiving and surrounding an end of the container therein;

first sealing means within the receptacle for engaging and sealing against exterior surfaces of the container along a first annular seal at an end of the container;

second sealing means within the receptacle for sealing against exterior surfaces of the container along a second annular seal spaced from the first annular seal;

wherein at least one of the first or second sealing means comprises a flexible yet resilient annular sealing member which in operation extends inwardly to the container surfaces against which it seals in a non-perpendicular, angled manner;

said first and second sealing means defining at least portions of an annular testing fluid chamber adapted to apply a differentially pressurized testing fluid about an annular testing zone portion of the exterior surfaces of the container when said first and second sealing means are in sealing engagement against the container; and means for providing a desired differential pressure within the testing fluid chamber and against the annular portion of the container which is being tested.

9. A container testing apparatus according to claim 8 wherein the sealing member is angled so that application of a differential sealing pressure within the testing fluid chamber causes the angularly extending sealing member to press more firmly against container surfaces.

10. A container testing apparatus for nondestructively testing a sealed container by applying a differential pressure to the container about limited annular portions of exterior surfaces of the container to aid in detecting leaks therein, comprising:

a frame;

at least one testing head mounted to said frame and having a container receptacle sized for receiving and surrounding an end of the container therein;

first sealing means within the receptacle for engaging and sealing against exterior surfaces of the container along a first annular seal at an end of the container;

second sealing means within the receptacle for sealing against exterior surfaces of the container along a second annular seal spaced from the first annular seal;

wherein both of said first and second sealing means comprise a flexible annular sealing member which extends angularly inward to contact container surfaces in a non-perpendicular manner;

said first and second sealing means defining at least portions of an annular testing fluid chamber adapted to apply a differentially pressurized testing fluid about an annular testing zone portion of the exterior surfaces of the container when said first and second sealing means are in sealing engagement against the container; and means for providing a desired differential pressure within the testing fluid chamber and against the annular portion of the container which is being tested.

11. A container testing apparatus for applying a differential pressure to a sealed container to aid in detecting leaks therein, comprising:

first sealing means for engaging and sealing against surfaces of the container along a first seal;

second sealing means for sealing against surfaces of the container along a second seal spaced from the first seal;

the first and second sealing means defining at least portions of a testing fluid chamber adapted to apply a differentially pressurized testing fluid about a portion of the container when said first and second sealing means are in sealing engagement against the container;

at least one of the first and second sealing means comprising a sealing member which is flexible, resilient and mounted to engage a container at an angle which causes pressure reinforcement of sealing force by the sealing member against the container when differentially pressurized testing fluid is provided in the testing fluid chamber; and means for providing a desired differential pressure within the testing fluid chamber.

12. A container testing apparatus according to claim 11 wherein the sealing member extends inwardly to the container surfaces against which it seals in a non-perpendicular manner, and in which a container engaging end of the seal is angled toward the side of the sealing member which experiences the greatest pressure during testing.

13. A container testing apparatus according to claim 12 wherein there are two sealing members angled toward a rim of a container which is being tested within the testing fluid chamber.

14. A container testing apparatus for applying a differential pressure to a sealed container to aid in detecting leaks therein, comprising:

a frame;

a testing head connected to the frame; said testing head having a container receptacle for receiving a portion of the container therein;

a container support connected to said frame for supporting the container during reception of the container with the container receptacle;

wherein the container support and testing head are mounted for relative motion toward and from each other;

biasing means for biasing the container from the container receptacle;

a first flexible sealing means mounted within the container receptacle for engaging a container along a first seal which is continuous and circuitous;

a second flexible sealing means mounted on the testing head for engaging the container along a second seal which is continuous, circuitous, and spaced from said first seal so as to define a testing zone on surfaces of said container which are adjacent to a testing fluid chamber which is enclosed during testing and at least partially defined by said first and second flexible sealing means;

said first and second flexible sealing means being mounted on said testing head so as to engage the container and deform thereagainst to effectuate sealing when the container is positioned within the container receptacle;

means for providing a desired differential pressure within the testing fluid chamber; and detector means for selectively detecting an effect associated with communication of fluid through a leak in the container within the testing zone.

15. A container testing apparatus for applying a differential pressure to a sealed container to aid in detecting leaks therein, comprising:

a frame;

a testing head connected to the frame; said testing head having a container receptacle for receiving a portion of the container therein;

a first flexible sealing means mounted within the container receptacle for engaging a container along a first seal which is continuous and circuitous;

a second flexible sealing means mounted on the testing head for engaging the container along a second seal which is continuous, circuitous, and spaced from said first seal so as to define a testing zone on surfaces of said container which are adjacent to a testing fluid chamber which is enclosed during testing and at least partially defined by said first and second flexible sealing means;

said first and second flexible sealing means being mounted on said testing head so as to engage the container and deform thereagainst to effectuate sealing when the container is positioned within the container receptacle;

wherein each of the first and second sealing means comprises a sealing member which is angled and engages the container surfaces at an angle to enhance sealing upon application of pressure across each of the first and second sealing means;

means for providing a desired differential pressure within the testing fluid chamber; and detector means for selectively detecting an effect associated with communication of fluid through a leak in the container within the testing zone.

16. The container testing apparatus of claim 15 wherein the first sealing means seals against end surfaces of the container adjacent where the end surfaces meet with container side wall surfaces leaving a substantial portion of the end surfaces open to atmospheric pressure.

17. A method for nondestructively detecting leaks in a sealed container, comprising:
applying a first annular sealing member against exterior surfaces of the container;
applying a second annular sealing member against exterior surfaces of the container;
the application of the first and second sealing members against the container forming an enclosed testing fluid chamber therebetween about exterior portions of the container being tested for leakage;
at least one of the first or second annular sealing members comprising a flexible seal which in operation extends to the container surfaces in a non-perpendicular manner relative to said container surfaces;
causing the at least one of the first or second annular sealing members to more effectively seal against the container surfaces by creating a desired differential pressure in a testing fluid contained within the testing fluid chamber; and
detecting an effect selectively associated with communication of fluid through a leak in the container adjacent the testing fluid chamber.

18. The method of claim 17 wherein the desired differential pressure is above atmospheric pressure.

19. The method of claim 17 wherein the desired differential pressure is below atmospheric pressure.

20. The method of claim 17 further comprising:
applying the first and second sealing members about annular container surfaces at or adjacent the end of a container.

21. A method for detecting leaks in a container, comprising:
applying a first sealing member against surfaces of the container;
applying a second sealing member against surfaces of the container;
the application of the first and second sealing members against the container forming an enclosed testing fluid chamber therebetween about a portion of the container being tested for leakage;
at least one of the first or second annular sealing members comprising a flexible seal which in operation extends to the container surfaces in a non-perpendicular manner relative to said container surfaces;
causing the at least one of the first or second annular sealing members to more effectively seal relative the container surfaces by creating a desired pressure in a testing fluid within the testing fluid chamber;
biasing the second sealing member away from surfaces of the container when the first and second sealing members are sealing disengaged relative to the container; and
detecting an effect selectively associated with communication of fluid through a leak in the container.

22. A method for detecting leaks in a container, comprising:
applying a first sealing member against surfaces of the container;
applying a second sealing member against surfaces of the container;
the application of the first and second sealing members against the container forming an enclosed testing fluid chamber therebetween about a portion of the container being tested for leakage;
at least one of the first or second annular sealing members comprising a flexible seal which in operation extends to the container surfaces in a non-perpendicular manner relative to said container surfaces;
causing the at least one of the first or second annular sealing members to more effectively seal relative the container surfaces by creating a desired pressure in a testing fluid within the testing fluid chamber;
applying the first sealing members against annular end surfaces of the container adjacent to where said end surfaces meet with container side wall surfaces leaving a substantial portion of the end surfaces of the container open to atmospheric pressure; and
detecting an effect selectively associated with communication of fluid through a leak in the container.

23. A method for detecting leaks in a container, comprising:
sealing a first sealing member against surfaces of a container along a first seal which is continuous and circuitous;
sealing a second sealing member against surfaces of a container along a second seal which is continuous and circuitous;
forming an enclosed testing fluid chamber between the first and second sealing members; said testing fluid chamber defining a testing zone on limited surface portions of the container;
providing a desired testing pressure within the testing fluid chamber and against the testing zone of the container;
detecting an effect selectively associated with communication of fluid through a leak in the container within the testing zone; and
wherein the first and second seals are both formed by engaging the container relative to the testing head and against the first and second sealing members; at least one of the first or second sealing members being a cantilevered sealing member which deforms and seals against the container.

24. A method according to claim 23 wherein both sealing members are cantilevered to deform and seal against the container.

25. A method according to claim 23 wherein at least one of the sealing members is angled to engage the container in an angled relationship which causes pressure reinforcement of sealing force when the testing fluid chamber is differentially pressurized.

26. A method according to claim 23 and further comprising supporting a cantilevered rim of the container with a container support.

27. A method according to claim 23 and further comprising biasing the container from the receptacle to aid in removal of the container after testing.

28. A container testing apparatus for nondestructively testing a sealed container for leaks by applying differentially pressurized testing fluid to limited portions of exterior surfaces of the container, comprising:
first sealing means for engaging and sealing against the exterior surfaces of the container along a first seal;
second sealing means spaced from said first sealing means for engaging and sealing against the exterior surfaces of the container along a second seal spaced from said first seal;

the first and second sealing means defining at least portions of a testing fluid chamber adapted to apply a differentially pressurized testing fluid to testing zone portions of the exterior surfaces of the container defined between said first and second seals;

seal actuation means for controllably moving at least one of said first or second sealing means between extended and retracted positions;

means for providing a desired differential pressure within the testing fluid chamber and against the testing zone portions of the container;

means for selectively detecting an effect associated with leakage through a leak in the container within the testing zone portions;

a compression ring for displacing the sealing member away from the container surfaces when the apparatus and container are sealingly disengaged.

29. A container testing apparatus for nondestructively testing a sealed container for leaks by applying differentially pressurized testing fluid to limited portions of exterior surfaces of the container, comprising:

first sealing means for engaging and sealing against the exterior surfaces of the container along a first seal;

second sealing means spaced from said first sealing means for engaging and sealing against the exterior surfaces of the container along a second seal spaced from said first seal;

the first and second sealing means defining at least portions of a testing fluid chamber adapted to apply a differentially pressurized testing fluid to testing zone portions of the exterior surfaces of the container defined between said first and second seals;

means for providing a desired differential pressure within the testing fluid chamber and against the testing zone portions of the container;

means for selectively detecting an effect associated with leakage through a leak in the container within the testing zone portions;

wherein at least one of the first or second sealing means comprises a flexible yet resilient annular sealing member which in operation extends inwardly to the container surfaces against which it seals in a non-perpendicular, angled manner.

30. A container testing apparatus for nondestructively testing a sealed container for leaks by applying differentially pressurized testing fluid to limited portions of exterior surfaces of the container, comprising:

first sealing means for engaging and sealing against the exterior surfaces of the container along a first seal;

second sealing means spaced from said first sealing means for engaging and sealing against the exterior surfaces of the container along a second seal spaced from said first seal;

the first and second sealing means defining at least portions of a testing fluid chamber adapted to apply a differentially pressurized testing fluid to testing zone portions of the exterior surfaces of the container defined between said first and second seals;

means for providing a desired differential pressure within the testing fluid chamber and against the testing zone portions of the container;

means for selectively detecting an effect associated with leakage through a leak in the container within the testing zone portions;

wherein both of said first and second sealing means comprise a flexible annular sealing member which extends angularly inward to contact container surfaces in a non-perpendicular manner.

31. A container testing apparatus according to claim 30 wherein the sealing member is angled so that application of a differential sealing pressure within the testing fluid chamber causes the angularly extending sealing member to press more firmly against container surfaces.

32. The method of claim 17 further comprising:
biasing the second sealing member away from surfaces of the container when the first and second sealing members are sealing disengaged relative to the container.

33. The method of claim 17 further comprising:
applying the first sealing member against annular end surfaces of the container adjacent to where said end surfaces meet with container side wall surfaces leaving a substantial portion of the end surfaces of the container open to atmospheric pressure.

* * * * *